(12) United States Patent
Braytenbaum et al.

(10) Patent No.: US 9,972,028 B2
(45) Date of Patent: May 15, 2018

(54) IDENTIFYING A SOCIAL LEADER

(71) Applicant: Mavenir LTD., Raanana (IL)

(72) Inventors: Amit Braytenbaum, Lehavim (IL); Omer Uretzky, Ramat Hasharon (IL)

(73) Assignee: Mavenir LTD., Raanana (IL)

( * ) Notice: Subject to any disclaimer, the term of this patent is extended or adjusted under 35 U.S.C. 154(b) by 0 days. days.

(21) Appl. No.: 14/208,504

(22) Filed: Mar. 13, 2014

(65) Prior Publication Data
US 2014/0280222 A1    Sep. 18, 2014

Related U.S. Application Data

(60) Provisional application No. 61/788,969, filed on Mar. 15, 2013, provisional application No. 61/791,042, filed on Mar. 15, 2013.

(51) Int. Cl.
*G06Q 30/02*    (2012.01)
*G06F 17/30*    (2006.01)
*G06Q 50/00*    (2012.01)
*H04L 29/08*    (2006.01)

(52) U.S. Cl.
CPC ..... *G06Q 30/0255* (2013.01); *G06F 17/3053* (2013.01); *G06Q 50/01* (2013.01); *H04L 67/22* (2013.01)

(58) Field of Classification Search
CPC .... G06Q 30/02; G06Q 50/01; G06Q 30/0201; G06Q 30/0251; G06Q 30/0255; G06Q 30/0269; G06Q 30/0271; G06F 17/3053; G06F 17/30699; G06F 17/30867; G06F 17/30554; G06F 17/30958; H04L 43/08; H04L 67/22
USPC ....... 709/224; 707/748, 798; 705/319, 14.73
See application file for complete search history.

(56) References Cited

U.S. PATENT DOCUMENTS 7,865,551 B2 * 1/2011 McCuller ............... G06Q 50/10
    709/204
8,606,792 B1 * 12/2013 Jackson ................. G06F 17/30
    707/748
8,655,938 B1 * 2/2014 Smith ................. G06F 17/3053
    706/45

(Continued)

OTHER PUBLICATIONS

Linyuan Lü etl al. "Leaders in Social Networks, the Delicious Case" Published: Jun. 27, 2011 http://dx.doi.org/10.1371/journal.pone.0021202.*

*Primary Examiner* — Dennis Truong
(74) *Attorney, Agent, or Firm* — Ohlandt, Greeley, Ruggiero & Perle, L.L.P.

(57) ABSTRACT

There are disclosed systems and methods for calculating the "social score" of users of social websites to determine who the "social leaders" are. The activities of users of social websites are monitored and activities weighted. The combined scores for the user's activities provide an absolute score for the particular user. The absolute score from a single social website, or combined absolute scores from a plurality of social websites, can be used. In either instance, the absolute score obtained of a user is compared to the absolute scores of other users and a relative score is obtained. The relative score provides a ranking of each user as compared to the rest of the user population. In this manner, social leaders, e.g., the top ten percent in relative score can be identified. Social leaders are of interest to various entities to provide targets for advertising, product test marketing, and the like.

24 Claims, 2 Drawing Sheets

(56) References Cited

U.S. PATENT DOCUMENTS

| | | |
|---|---|---|
| 9,171,275 B2* | 10/2015 | Seligmann ............ G06Q 10/06 |
| 2007/0198510 A1 | 8/2007 | Ebanks |
| 2009/0228233 A1* | 9/2009 | Anderson ............. G06Q 10/10 |
| | | 702/127 |
| 2010/0088130 A1* | 4/2010 | Bonchi ............ G06Q 10/06395 |
| | | 705/7.41 |
| 2010/0161369 A1* | 6/2010 | Farrell ................. G06Q 50/01 |
| | | 705/319 |
| 2011/0153502 A1* | 6/2011 | Jean-Claude ...... G06Q 20/3672 |
| | | 705/66 |
| 2011/0295626 A1* | 12/2011 | Chen .................... G06Q 30/02 |
| | | 705/7.11 |
| 2011/0296004 A1* | 12/2011 | Swahar ............. G06F 17/3053 |
| | | 709/224 |
| 2012/0130886 A1* | 5/2012 | Shergill ............ G06Q 30/0217 |
| | | 705/39 |
| 2012/0233256 A1 | 9/2012 | Shahan et al. |
| 2012/0296733 A1* | 11/2012 | Piros ..................... G06Q 30/02 |
| | | 705/14.39 |
| 2013/0041860 A1* | 2/2013 | Lawrence ............. G06Q 50/01 |
| | | 706/46 |
| 2013/0097236 A1* | 4/2013 | Khorashadi ........... H04H 60/25 |
| | | 709/204 |
| 2013/0139048 A1* | 5/2013 | Dhawan ............ G06Q 30/0278 |
| | | 715/234 |
| 2013/0166540 A1* | 6/2013 | Ganesh ............ G06F 17/30864 |
| | | 707/722 |
| 2013/0254280 A1* | 9/2013 | Yang ..................... G06Q 50/01 |
| | | 709/204 |
| 2013/0304726 A1* | 11/2013 | Sandulescu ....... G06F 17/30864 |
| | | 707/722 |
| 2015/0120782 A1* | 4/2015 | Kim .................. G06F 17/3053 |
| | | 707/798 |

\* cited by examiner

IDENTIFYING A SOCIAL LEADER

CROSS-REFERENCED APPLICATIONS

This application is related, and claims priority, to U.S. Provisional Application No. 61/788,969, filed on Mar. 15, 2013 that is incorporated herein in its entirety by reference. This application is also related, and claims priority to, U.S. Provisional Application Ser. No. 61/791,042, filed on Mar. 15, 2013 that is also incorporated herein in its entirety by reference.

BACKGROUND OF THE DISCLOSURE

1. Field of the Disclosure

The present disclosure relates generally to a technique for calculating the "social score" of users of social websites to determine the "social leaders". More particularly, the present disclosure relates to methods to quantify more accurately the degree and extent of influence a user of a social site has.

2. Background of the Disclosure

Web or network-based applications having a social aspect are increasing in both number and popularity. For example, websites such as Facebook®, Twitter®, and LinkedIn®, to name just a few, are fast becoming some of the most visited and used websites on the Internet. These sites provide channels of communication, comment, viewpoint, etc., for all the users, as well as for the people with whom the user is in contact, or who are in contact with the user, whether directly or indirectly. Although each of these social sites is quite different, they share in common some key concepts. For instance, each of these social sites allows a user to define his or her relationship with other users, and in some instances, other objects or entities. These relationships can be defined as, e.g., "followers" on Twitter®, "friends" on Facebook®, or "connections" on LinkedIn®. In addition, each of these social sites allows users to provide comments concerning the information displayed, or shown, by other users with whom the user is in contact, such as "likes" and/or "comments" relating to postings, messages, viewpoints, reviews, pictures and the like.

Anecdotally, certain people could be "identified" as possible "social leaders" on each of these sites, such as by counting the number of "friends", "followers" and/or "connections" of a person. However, attempting to use such a one-dimensional view or aspect of an individual (even of a "famous" person) on such social sites can be misleading because the actual influence of that person over his or her "friends", "followers" and/or "connections" cannot be determined. In fact, there is presently no way to measure the actual potential influence users of social sites actually have with respect to their "friends", "followers" and "connections" and, therefore, there is no way to assess who may be a social leader.

Therefore, a need exists to have a method to quantify more accurately the degree and extent of influence which a user of a social site has with respect to his or her "friends", "followers" and "connections", and the like, rather than rely only upon anecdotal parameters, such as the mere number of a person's followers.

The quantification of the actual influence that a user of a social site may have should find use with respect to, e.g., advertisers, manufacturers, websites, etc. If the actual influence of the user of a social site can be quantified, an entity, e.g., an advertiser, will be able to direct an advertising campaign or other information to the social leader with some degree of confidence that the "friends", "followers" and "connections" of the social leader are likely to become aware of that information. If the social leader comments positively about the information, the "friends", "followers" and "connections" may be persuaded in a direction desired by the advertiser. In another example, by using an objectively calculated social score, websites directed to particular fields or products will be more likely to identify, contact and persuade social leaders who will influence others to visit the websites. contact and persuade social leaders who will influence others to visit the websites.

In short, social leaders are those identified by the clout, influence and popularity that they have vis-à-vis "friends", "followers" and "connections".

These and other needs are met according to the present disclosure, as will be more fully described in the paragraphs that follow.

SUMMARY OF THE DISCLOSURE

The present disclosure provides methods and/or techniques to calculate the "social score" of a user of social websites to more accurately quantify the degree and extent of influence the user has and, thus, determine whether the user is a "social leader".

The present disclosure also provides a method that includes gathering information in various categories about a user of a social site, determining the number of events in each category of information, assigning a weight factor to each category of information, multiplying the number of events by the weight factor for each category of information to obtain a product for each category of information, adding the products obtained to obtain an absolute social score for the user, repeating the gathering, determining, assigning, multiplying and adding for a plurality of users, and comparing the absolute social score for the plurality of users to each other to obtain a ranking of relative social score for the plurality of users to determine a social leader. The present method can also include updating the information of a user based upon the user's activity while logged onto a social site which includes recognizing that a user of a social site is logging onto a social site, accessing the social site concurrently with the user logging on, monitoring activity of the user while the user is on the social site, gathering information concerning the activity of the user while the user is logged onto the social site, and updating the absolute social score of the user using the information gathered concerning the user activity while the user is logged onto the social site.

The present disclosure further provides an apparatus/system that performs the methods discussed above. The apparatus/system includes a processor and a memory that contains instructions that are readable by said processor and cause said processor to: gather information in various categories about a user of a social site; determine the number of events in each category of information; assign a weight factor to each category of information; multiply the number of events by the weight factor for each category of information to obtain a product for each category of information; add the products obtained to obtain an absolute social score for the user; repeat the gathering, determining, assigning, multiplying and adding for a plurality of users; and compare the absolute social score for the plurality of users to each other to obtain a ranking of relative social score for the plurality of users to determine a social leader.

The present apparatus/system may also include instructions that cause said processor to: recognize that a user of a social site is logging onto a social site; access the social site concurrently with the user logging on; monitor activity of the user while the user is on the social site; gather information concerning the activity of the user while the user is logged onto the social site; and update the absolute social score of the user using the information gathered concerning the user activity while the user is logged onto the social site.

The present disclosure still further provides a storage device comprising instructions that are readable by a processor and cause said processor to: gather information in various categories about a user of a social site; determine the number of events in each category of information; assign a weight factor to each category of information; multiply the number of events by the weight factor for each category of information to obtain a product for each category of information; add the products obtained to obtain an absolute social score for the user; repeat the gathering, determining, assigning, multiplying and adding for a plurality of users; and compare the absolute social score for the plurality of users to each other to obtain a ranking of relative social score for the plurality of users to determine a social leader.

The present storage device may also include instructions that further cause said processor to: recognize that a user of a social site is logging onto a social site; access the social site concurrently with the user logging on; monitor activity of the user while the user is on the social site; gather information concerning the activity of the user while the user is logged onto the social site; and update the absolute social score of the user using the information gathered concerning the user activity while the user is logged onto the social site.

The apparatus/system and techniques described herein are applicable to any social site for the gathering of information concerning the activity and evaluation of one or more user's absolute social score and for determining the relative social score for a plurality of users of any social site. The evaluation may be tailored to the needs or interests of any entity having a desire to know which user(s) may be a social leader under the parameters of interest to that entity.

DETAILED DESCRIPTION OF THE PREFERRED EMBODIMENTS

Figure 1:
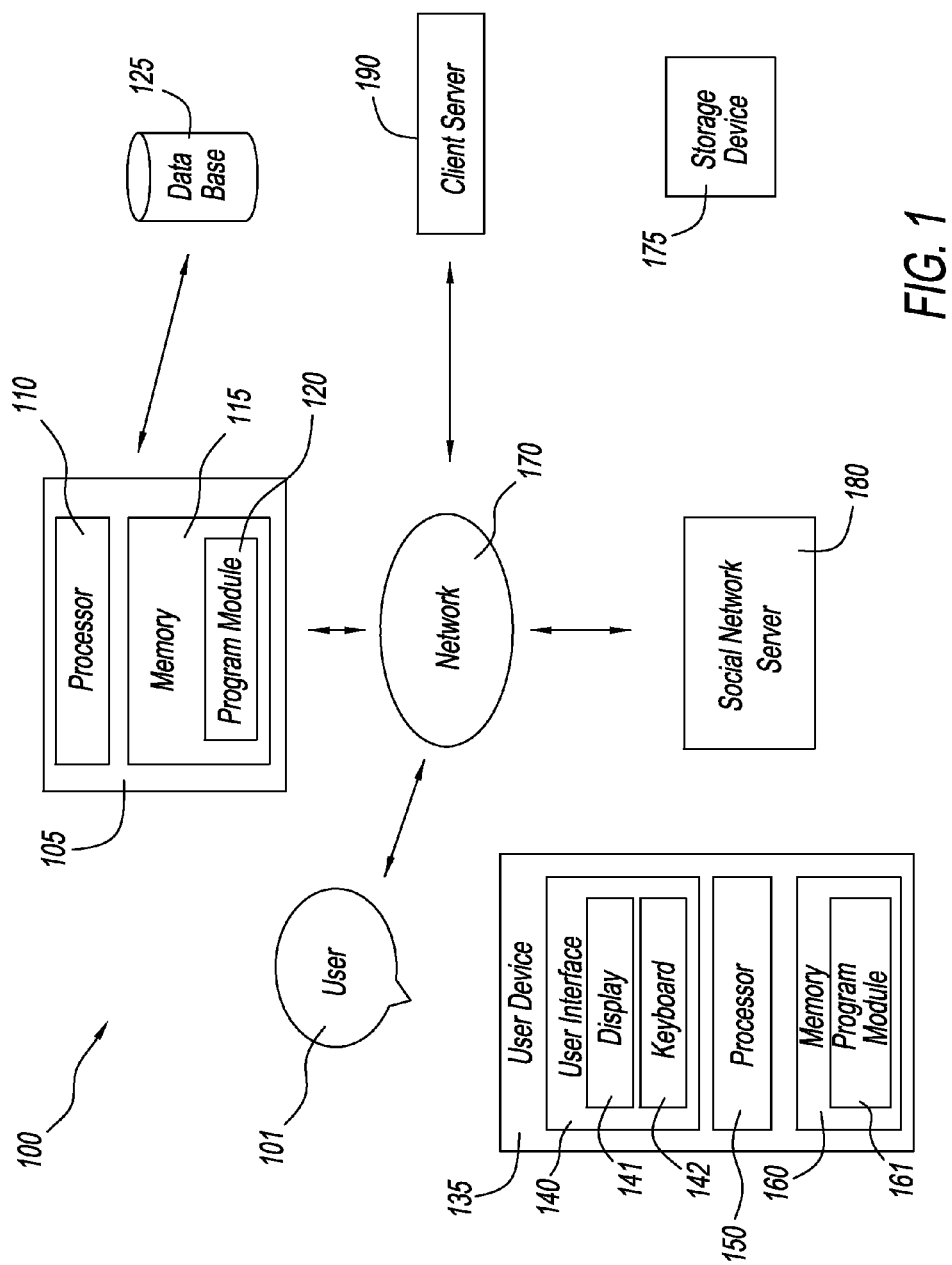
FIG. 1 is a block diagram of a system that employs the techniques described herein.

Referring to the drawings and, in particular, FIG. 1, a system generally represented by reference numeral 100 is shown that employs the methods described herein. System 100 includes a server 105, a user device 135, a social network server 180, and a client server 190, each of which is communicatively coupled to a network 170, e.g., the Internet. User device 135 is utilized by a user 101.

Server 105 includes a processor 110 and a memory 115. Although server 105 is represented herein as a standalone device, it is not limited to such, but instead can be coupled to other devices (not shown) in a distributed processing system. Server 105 is also communicatively coupled to a database 125. Server 105 can also operate to support performance of relevant operations of system 100 in a "cloud computing" environment or within the context of "software as a service" (SaaS). At least some operations of server 105 can be performed by a group of computers (as examples of machines including processors), these operations being accessible via network 170 via one or more appropriate interfaces, e.g., application program interfaces (APIs).

Processor 110 is an electronic device configured of logic circuitry that responds to and executes instructions. Memory 115 is a tangible computer-readable storage device encoded with one or more computer programs. In this regard, memory 115 stores data and instructions that are readable and executable by processor 110 for controlling the operation of processor 110. Memory 115 can be implemented in a random access memory (RAM), a hard drive, a read only memory (ROM), or a combination thereof. One component of memory 115 is a program module 120.

User device 135 includes a user interface 140, a processor 150 and a memory 160. User 101 utilizes user device 135 to access social network server 180, e.g., Facebook®, Twitter®, and/or LinkedIn®, via network 170. User device 135 can be implemented, for example, as a cell phone, a personal computer (PC), a tablet PC, a set-top box (STB), a Personal Digital Assistant (PDA), or any device capable of executing instructions, sequential or otherwise, that specify actions to be taken by that device.

User interface 140 includes a display 141 and a keyboard 142. Display 141 is a device by which system 100 presents information in visual form to user 101. By keyboard 142, user 101 inputs information to user device 135, and to social network server 180 via network 170. User interface 140 also includes a cursor control mechanism, such as a mouse, track-ball, joy stick, or a touch-screen, that is compatible with display 141 that allows user 101 to manipulate a cursor on display 141 for communicating additional information and command selections to user device 135 and social network server 180.

Processor 150 is an electronic device configured of logic circuitry that responds to and executes instructions.

Memory 160 is a tangible computer-readable storage device encoded with a computer program. In this regard, memory 160 stores data and instructions readable and executable by processor 150 for controlling the operation of processor 150. Memory 160 can be implemented in a RAM, a hard drive, a ROM, or a combination thereof. One component of memory 160 is a program module 161.

The term "module" is used herein to denote a functional operation that can be embodied either as a stand-alone component or as an integrated configuration of a plurality of subordinate components. Thus, each of program modules 120 and 161 can be implemented as a single module or as a plurality of modules that operate in cooperation with one another. Moreover, although program modules 120 and 161 are described herein as being installed in memory 115 and memory 160, respectively, and therefore being implemented in software, they could be implemented in any of hardware, e.g., electronic circuitry, firmware, software, or a combination thereof.

While program modules 120 and 161 are indicated as already being loaded into memories 115 and 160, respectively, they may be configured on a storage device 175 for subsequent loading into memories 115 and 161. Storage device 175 is a tangible computer-readable storage medium that stores program modules 120 and 161 thereon. Examples of storage device 175 include a compact disk, a magnetic tape, a read only memory, an optical storage media, a hard drive or a memory unit having multiple parallel hard drives, and a universal serial bus (USB) flash drive. Alternatively, storage device 175 can be a random access memory, or other type of electronic storage device, located on a remote storage system (not shown) and coupled to server 105 and user device 135 via network 170.

Client server 190 accesses server 105 via a password or other security mechanism to, in turn, access data from server 105 for reasons and methods described in more detail herein below.

In practice, system 100 will include participation by many users (not shown) whom each employ a respective user device (not shown) similar to that of user device 135 to utilize and interact with social network server 180.

Figure 2:
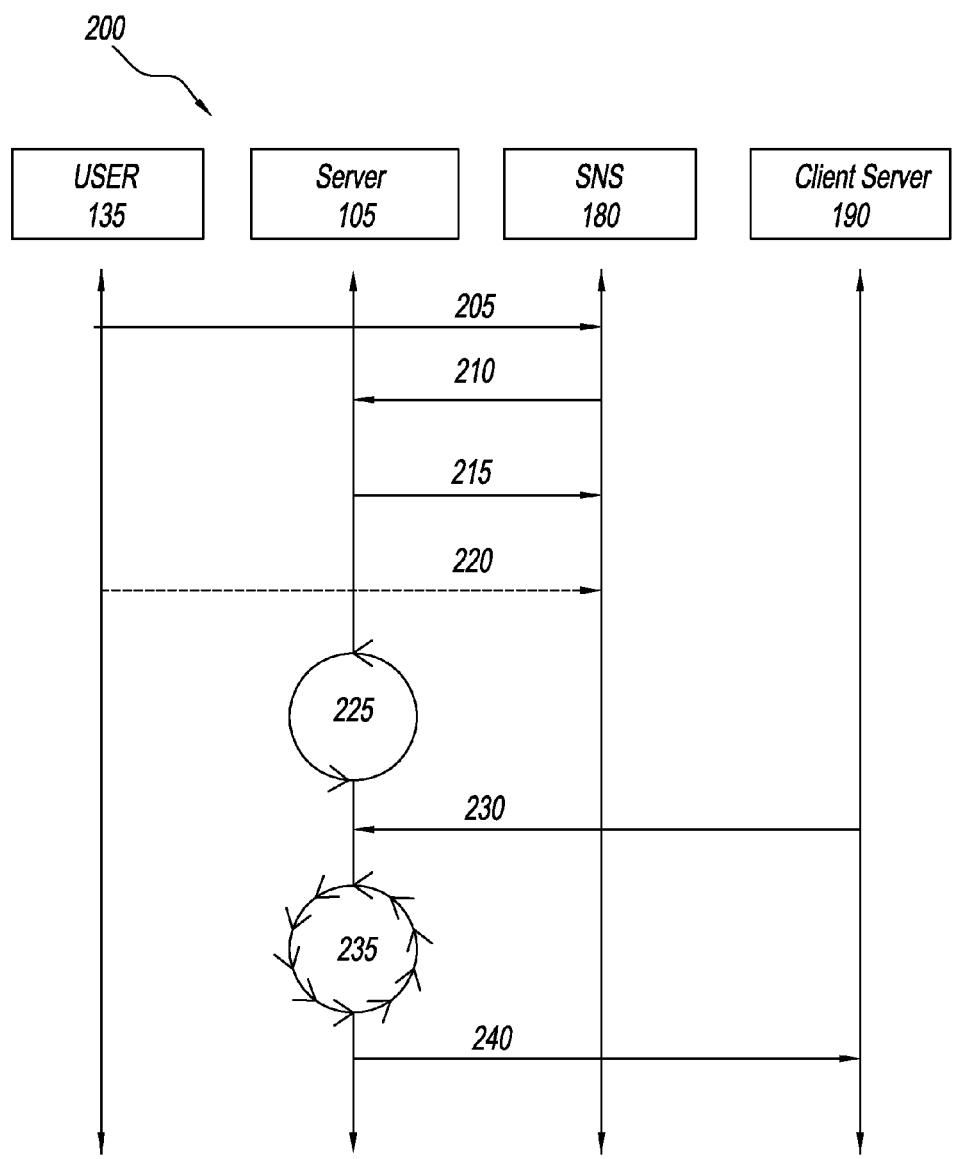
FIG. 2 is a flow chart of a process that employs the techniques described herein.

FIG. 2 shows a method 200 for gathering information concerning user's 101 utilization of, and interaction with, social network server 180. While FIG. 2 shows the steps of method 200 being performed sequentially, it will be appreciated that certain of the steps can be performed concurrently or continuously. Method 200 commences with step 205.

In step 205, user 101 logs onto social network server 180 via network 170 using, e.g., user device 135. From step 205, method 200 progresses to step 210.

In step 210, social network server 180, in a communication via network 170, notifies server 105 that user 101 has logged onto to social network server 180. From step 210, method 200 progresses to step 215.

In step 215, as user 101 performs activities on social network server 180, server 105 gathers information about activity of other users 101 vis-à-vis user's activities, e.g., "posts" made by other users 101 relative to user's activity, "comments" made by other users 101 relative to user's activity, "likes" made by other users 101 to user's "posts" and/or "comments". In step 215, server 105 can continually update user's 101 social score or, alternatively, server 105 can update user's 101 social score at regular timed intervals or, still alternatively, can update user's 101 social score only when user 101 logs off from social network server 180. From step 215, method 200 progresses to step 220.

In step 220, user 101 logs off the social site and server 105 no longer monitors and gathers information concerning user's activities while logged onto the social site. From step 220, method 200 progresses to step 225.

In step 225, server 105 updates user's 101 absolute social score and relative social score, and these updated social scores are stored in memory 115 and/or in data base 125. From step 225, method 200 progresses to step 230.

In step 230, server 105 receives a query from client server 190 for a social score analysis based upon parameters designated by the query sent from client server 190 to server 105. The parameters can be parameters set by client server 190 from previous queries or specific parameters can be included in the new query. As mentioned above, the query from client server 190 can be predicated upon any analysis of users' 101 social score desired by client server 190. From step 230, method 200 progresses to step 235.

In step 235, server 105 calculates user(s) 101 social score based upon parameters set forth in the query made by client server 190. From step 235, method 200 progresses to step 240.

In step 240, based upon the query by client server 190, server 105 provides client server 190 with the identity of the social leader or leaders resulting from the analysis of the social score data by client server 105 in accordance with the query and parameters set by client server 190.

Method 200 then ends.

The operation of apparatus/system and the method of the present disclosure will be described in more detail below.

User(s) 101 usually have information on two levels. The first level is public information; information that is generally available to everyone, such as a profile on Facebook® or LinkedIn®, and this information is available and can be gathered whether or not the user(s) 101 are logged onto the site. In some cases, the publicly available information is obtained by querying a social site, for example, via an application programming interface (API) request. For instance, social network services provide various public interfaces (e.g., API's) through which information can be obtained. Also, all user(s) 101 have an electronic ID which, if available to server 105, allows server 105 to identify user(s) 101 moving from one social site to another, and to determine if user(s) 101 can be considered a social leader on more than one social site.

The second level is private information; information that can only be seen by, e.g., "friends", or perhaps "friends of friends". This information can only be gathered when user(s) 101 are actively logged onto the social site. As user(s) 101 log onto a social site, social network server 180 notifies server 105 of user(s) 101 activity. As with public information, server 105 can query the social site via an API to obtain the private information of user(s) 101 when any user 101 logs onto a social site and begins a session. Server 105 monitors the activity of user(s) 101 while user(s) 101 are logged onto a social site. As user(s) 101 input information on the social site, server 105 gathers that information and updates user(s)' 101 social score.

Thus, gathering public information about user(s) 101 can be performed at any time by server 105 in a batch-type collection manner. On the other hand, private information is gathered when user(s) 101 are logged onto a social site and perform activities on the social site in a dynamic-type collection manner. Once again, user(s) 101 social score is updated as user(s) 101 perform activity when logged onto a social site.

The "absolute score" for user(s) 101 is described in more detail below.

Using the public and private information gathered by server 105, the present disclosure describes methods and systems for quantitatively calculating the "rank" of different user(s) 101 of social sites based on an analysis of various sources of social information. In the following description, for purposes of explanation, numerous specific details are set forth in order to provide a thorough understanding of the various aspects of different embodiments of the present disclosure. It will be evident to one skilled in the art that the present disclosure can be practiced without all of the mentioned specific details.

In general, the "rank" of user(s) 101 of social sites is comprised of two components. As the first component of rank, user(s) 101 are assigned an "absolute score". The "absolute score" is a weighted sum of individual "elements" that are multiplied by a "weight" factor. However, the absolute score can vary depending upon the focus of, or the goal or impact sought by, the client via client server 190. For example, one client query via client server 190 can place more emphasis upon the number of "friends" or "followers" of user(s) of a social site, while another client query via client server 190 can place more emphasis upon user(s) 101 content which is "liked" or "commented" upon. These factors will be explained in more detail herein below. Thus, the focus of the absolute score that is determined is, in general, based on its relevance with respect to the goal of a client query via client server 190. Although server 105 gathers information on all of the same "elements" for user(s) 101, the elements that are actually used and the weight accorded to each element comprising the absolute score for user(s) 101 is to some degree dependent upon the specific client query made via client server 190.

The second component of rank is a "relative score". Once all the user(s) 101 of a social site are assigned an "absolute score" according to the query from client server 190, those absolute scores are normalized so that user(s) 101 of the social site with the highest absolute score is ranked "100" and all other user(s) 101 are ranked relative to user 101 with the highest absolute score. This methodology will also be explained in more detail below.

By using this combination of the "rank" components of absolute score and relative score, one or more social leader(s) can be identified and targeted. In this regard, social leaders can be randomly characterized as those user(s) 101 of social sites in the, e.g., top 10%, top 5%, or top 1%, based upon relative score. In addition, there can be included other subjective characterizations of user(s) 101 of the social site based upon relative score. For example, assuming that an analysis of user(s) 101 of a social site yields an average absolute score of 1000, any user 101 of the social site having an absolute score of, e.g., 20%, 30% or 50% above this average absolute score can be characterized as a social leader. Depending upon the target of client server 190, social leaders can be identified as the target for client server 190.

The systems and methods of the present disclosure allow for flexibility in the identification of social leaders, according to the needs of each client query made via client server 190. In more detail, the target user(s) 101 for each client server 190 can be all social leaders within the top 10%, or any other target group of user(s) 101. Depending upon the focus or goal of client server 190, the target can change. The flexibility of the method and system of the present disclosure also allows for the testing of various target groups of social leaders.

Also, this information can be of particular interest to and for use by entities, e.g., advertisers and websites, who can then direct advertising campaigns or other information to the "social leaders" so that, e.g., the "friends" and "followers" of the social leaders will become exposed to the campaigns or other information from a source, i.e., the "social leader", who can influence his or her "friends' and "followers" in respect of the advertising or other information.

In the example that follows, the method performed by the system described herein is set forth in simplified terms. In the example, it is seen that user(s) 101 social score is based upon user-derived content and network-derived content. User-derived content is that which is based upon user(s) 101 activities, and includes the number of times a user's 101 postings are "seen", and the "likes"/"comments"/"shares" by other users 101 with respect to user's 101 postings. The network-derived content is activity concerning user 101 that is based upon activity by others vis-a-vis user(s) 101, as can be seen by the categories included in network-derived content.

As mentioned, the example that follows is simplified, and the "level of importance" and/or "weights" associated with each category are flexible and depend upon the focus of any particular query by client server 190.

EXAMPLE

The information gathered concerning user(s) 101, as mentioned above, includes user-derived content and network-derived content. An example of both types of content is provided below.

| 1st Level Algorithm (User-Derived Content) | | | |
|---|---|---|---|
| Post by User | Level of Importance | Level of Exposure | Parameters Involved |
| "Seen" | 4 | Friends only | Friends and Followers |
| "Likes" | 3 | Friends + | Average Number of Likes/Post |
| "Comments" | 2 | Friends ++ | Average Number of Comments/Post |
| "Shares" | 1 | Friends + $2^{nd}$ degree | Average Number of Shares/Post |

(Number of "Seen" by Friends * Weight 1) + (Number of "Seen" by Followers * Weight 2) + (Avg. No. of "Likes" per Post * Weight 3) + (Avg. No. of "Comments" per Post * Weight 4) + (Avg. No. of "Shares" per Post * Weight 5)
Weight 1 < Weight 2 < Weight 3 < Weight 4 < Weight 5

| 2nd Level Algorithm (Network-Derived Content) | | |
|---|---|---|
| Parameter | Level of importance | Level of exposure |
| Number of Groups Owned * Number of People in the Group | 4 | Size of Group |
| Number of Pictures User Was Tagged In | 5 | Friends and Followers |
| Number of Posts User Was Mentioned In | 2 | Friends and Followers |
| Number of Posts to User Wall | 4 | Friends and Followers |

(Number of Groups Owned * Number of People in the Group * Weight 6) + (Number of Pictures Tagged In * Weight 7) + (Number of Mentions in Posts * Weight 8) + (Number of Posts to User Wall * Weight 9)**
**(Note: Information of the Previous 12 months)
Weight 7 < Weight 6 = Weight 9 < Weight 8

Using the information gathered and analyzed according to the algorithms of the preceding paragraph, user(s) 101 absolute score(s) may be calculated.

| User's profile | | |
|---|---|---|
| Parameter | Number | Weight |
| Friends | 250 | 4 (1000) |
| Followers | 30 | 8 (240) |
| Average Likes/Post | 15 | 12 (180) |
| Average Comments/Post | 10 | 20 (200) |
| Average Shares/Post | 4 | 30 (120) |
| Groups Owned * Members in Group | 20 | 4 (80) |
| Number of Pictures User Tagged In (During Previous Year) | 10 | 2 (20) |
| Number of User Mentions in Posts (During Previous Year) | 8 | 20 (160) |
| Number of Posts to User (During Previous Year) | 15 | 4 (60) |
| Absolute Score | | 2060 |

The Absolute Score is calculated by multiplying the Number column by the Weight column and the Absolute Score is the sum of the resulting numbers (in parentheses).

Using the absolute scores for a sample of user(s) 101, provides an example of the manner in which relative score is calculated.

| User | Absolute Score | Rank | Relative score |
|---|---|---|---|
| User 1 | 650 | 12 | 31.25 |
| User 2 | 500 | 15 | 12.5 |
| User 3 | 1200 | 9 | 50 |

-continued

| User | Absolute Score | Rank | Relative score |
|---|---|---|---|
| User 4 | 1700 | 5 | 75 |
| User 5 | 700 | 11 | 37.5 |
| User 6 | 600 | 13 | 25 |
| User 7 | 540 | 14 | 18.75 |
| User 8 | 190 | 16 | 6.25 |
| User 9 | 2500 | 2 | 93.75 |
| User 10 | 2200 | 3 | 87.5 |
| User 11 | 1542 | 6 | 68.75 |
| User 12 | 1324 | 7 | 62.5 |
| User 13 | 2050 | 4 | 81.25 |
| User 14 | 2800 | 1 | 100 |
| User 15 | 850 | 10 | 43.75 |
| User 16 | 1300 | 8 | 31.25 |

The Relative Score indicates the percentile position of a user relative to other users. The Relative Score is calculated as following: (1−(the number of people that have a higher absolute score than user/total number of people))*100. In this case, the Relative Score=(1−(rank)/16)*100. For example, user 14 is at rank=1, and (1−(0)/16)*100=100; therefore user 14 Relative Score is 100. Also for example, user 8 is at rank 16, and (1−(15/16)*100=6.25. Of course, the above example is simplified. The calculation of Absolute Score and Relative Score would be performed upon thousands, hundreds of thousands and perhaps millions of users of any social site at any particular instant when client server 190 provides a query and requests information concerning user(s) 101 social score(s).

The terms "comprises" or "comprising" are to be interpreted as specifying the presence of the stated features, integers, steps or components, but not precluding the presence of one or more other features, integers, steps or components or groups thereof.

It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

What is claimed is:

1. A method for determining a social leader on a social site, the method comprising:
   gathering information in a plurality of categories about a user of the social site, wherein the categories are selected from user-derived content and network-derived content, wherein the user-derived content is posts, and wherein the network-derived content is selected from the group consisting of: the number of groups owned by the user; the number of pictures of the user; and the number of posts relating to the user;
   determining the number of events in each category of information;
   receiving a query to initiate a social score analysis, wherein the analysis is based upon parameters designated by the query;
   selecting categories of information, wherein each category of information selected is determined by parameters designated by the query;
   assigning a weight factor to each category of information, wherein the weight factor assigned to each category of information is determined by the parameters designated by the query;
   multiplying the number of events by the weight factor for each category of information to obtain a product for each category of information;
   adding the products to obtain an absolute social score for the user;
   repeating the gathering, determining, assigning, multiplying and adding steps for a plurality of other users of the social site to obtain an absolute social score for the plurality of other users;
   comparing the absolute social score for the user and the absolute score for the plurality of other users to obtain a ranking of relative social scores; and determining the social leader from the comparison.

2. The method of claim 1, further comprising updating the information of the user based upon the activity of the user while logged onto a social site, comprising:
   recognizing that the user of the social site is logging onto a social site;
   accessing the social site concurrently with the user logging on;
   monitoring activity of the user while the user is on the social site;
   gathering information in the plurality of categories concerning the activity of the user while the user is logged onto the social site; and
   updating the number of events in each category of information relating to the user using the information gathered concerning the activity of the user while the user is logged onto the social site.

3. The method of claim 1, wherein the events of the user-derived content comprise the number of times each post is: seen by the plurality of other users, liked by the plurality of other users, commented on by the plurality of other users and shared by the plurality of other users.

4. The method of claim 3, wherein the number of times each post is seen by the plurality of one or more other users who is a friend of the user is given a weight 1, wherein the number of times each post is seen by the plurality of one or more other users who is a follower of the user is given a weight 2, wherein the average number of times each post is liked by the plurality of one or more other users is given a weight 3, wherein the average number of times each post is commented on by the plurality of one or more other users is given a weight 4, wherein the average number of times each post is shared by the plurality of one or more other users is given a weight 5, and wherein weight 1≤weight 2≤weight 3≤weight 4≤weight 5.

5. The method of claim 1, wherein the events of the network-derived content comprise the product of the number of groups owned by a user multiplied by the number of people in each group, the number of pictures the user was tagged in, the number of posts the user was mentioned in and the number of posts to the user's wall.

6. The method of claim 5, wherein the number of groups owned by the user multiplied by the number of people in each group is given a weight 6, wherein the number of pictures the user was tagged in by the plurality of one or more other users is given a weight 7, wherein the number of posts the user was mentioned in by the plurality of one or more other users is given a weight 8, wherein the number of posts to the user's wall by the plurality of one or more other users is given a weight 9, and wherein weight 7≤weight 6=weight 9≤weight 8.

7. The method of claim 1, wherein the social leader is selected from the user and the plurality of other users in the top 1%-10% of users based upon the relative scores.

8. The method of claim 1, wherein the social leader is selected from the user and the plurality of other users having an absolute score of 20%-50% above the average absolute score.

9. An apparatus for determining a social leader on a social site, the apparatus comprising:
   a processor; and
   a memory that contains instructions that are readable by the processor and cause the processor to:
   gather information in a plurality of categories about a user of the social site, wherein the plurality of categories are user-derived content and network-derived content, wherein the user-derived content is posts, and wherein the network-derived content is selected from the group consisting of: the number of groups owned by the user: the number of pictures of the user: and the number of posts relating to the user;
   determine the number of events in each category of information;
   receive a query to initiate a social score analysis, wherein the analysis is based upon parameters designated by the query;
   select desired categories of information, wherein the desired categories of information selected are determined by the parameters designated by the query;
   assign a weight factor to each category of information, wherein the weight factor for each desired category of information is determined by the parameters designated by the query;
   multiply the number of events by the weight factor for each desired category of information to obtain a product for each category of information;
   add the products to obtain an absolute social score for the user;
   repeat the gather, determine, receive, select, assign, multiply and add steps for a plurality of other users of the social site to obtain an absolute social score for the plurality of other users;
   compare the absolute social score for the user and the absolute score of the plurality of other users to obtain a ranking of relative social scores; and determine the social leader from the comparison.

10. The apparatus of claim 9, wherein the instructions further cause the processor to:
   recognize that the user of the social site is logging onto a social site;
   access the social site concurrently with the user logging on;
   monitor activity of the user while the user is on the social site;
   gather information in the plurality of categories concerning the activity of the user while the user is logged onto the social site; and
   update the number of events in each category of information relating to the user using the information gathered concerning the user activity while the user is logged onto the social site.

11. The apparatus of claim 9, wherein the events of the user-derived content comprise the number of times each post is: seen by the plurality of other users, liked by the plurality of other users, commented on by the plurality of other users and shared by the plurality of other users.

12. The apparatus of claim 11, wherein the number of times each post is seen by the plurality of one or more other users who is a friend of the user is given a weight 1, wherein the number of times each post is seen by the plurality of one or more other users who is a follower of the user is given a weight 2, wherein the average number of times each post is liked by the plurality of one or more other users is given a weight 3, wherein the average number of times each post is commented on by the plurality of one or more other users is given a weight 4, wherein the average number of times each post is shared by the plurality of one or more other users is given a weight 5, and wherein weight 1≤weight 2≤weight 3≤weight 4≤weight 5.

13. The apparatus of claim 9, wherein the events of the network-derived content comprise the product of the number of groups owned by the user multiplied by the number of people in each group, the number of pictures the user was tagged in, the number of posts the user was mentioned in and the number of posts to a user's wall.

14. The apparatus of claims 13, wherein the number of groups owned by the user multiplied by the number of people in each group is given a weight 6, wherein the number of pictures the user was tagged in by the plurality of one or more other users is given a weight 7, wherein the number of posts the user was mentioned in by the plurality of one or more other users is given a weight 8, wherein the number of posts to the user's wall by the plurality of one or more other users is given a weight 9, and wherein weight 7≤weight 6=weight 9≤weight 8.

15. The apparatus of claim 9, wherein the social leader is selected from the user and the plurality of other users in the top 1%-10% of users based upon the relative scores.

16. The apparatus of claim 9, wherein the social leader is selected from the user and the plurality of other users of having an absolute score of 20%-50% above the average absolute score.

17. A storage device for determining a social leader on a social site, the apparatus, the storage device comprising instructions that are readable by a processor and cause said processor to:
   gather information in a plurality of categories about a user of a social site, wherein the plurality of categories are selected from user-derived content and network-derived content, wherein the user-derived content is posts, and wherein the network-derived content is selected from the group consisting of: the number of groups owned by the user; the number of pictures of the user; and the number of posts relating to the user;
   determine the number of events in each category of information;
   receive a query to initiate a social score analysis, wherein the analysis is based upon parameters designated by the query;
   select categories of information, wherein the categories of information selected are determined by the parameters designated by the query;
   assign a weight factor to each category of information, wherein the weight factor for each category of information is determined by the parameters designated by the query;
   multiply the number of events by the weight factor for each category of information to obtain a product for each category of information;
   add the products to obtain an absolute social score for the user;
   repeat the gather, determine, receive, select, assign, multiply and add steps for a plurality of other users of the social site to obtain an absolute social score for the plurality of other users;
   compare the absolute social score for the user and absolute score of the plurality of other users to obtain a ranking of relative social scores; and determine the social leader from the comparison.

18. The storage device of claim 17, wherein the instructions further cause the processor to:
recognize that the user of the social site is logging onto a social site;
access the social site concurrently with the user logging on;
monitor activity of the user while the user is on the social site;
gather information in the plurality of categories concerning the activity of the user while the user is logged onto the social site; and
update the number of events in each category of information relating to the user using the information gathered concerning the user activity while the user is logged onto the social site.

19. The storage device of claim 18, wherein the events of the user-derived content comprise the number of times each post is: seen by the plurality of other users, liked by the plurality of other users, commented on by the plurality of other users and shared by the plurality of other users.

20. The storage device of claim 19, wherein the number of times each post is seen by the plurality of one or more other users who is a friend of the user is given a weight 1, wherein the number of times each post is seen by the plurality of one or more other users who is a follower of the user is given a weight 2, wherein the average number of times each post is liked by the plurality of one or more other users is given a weight 3, wherein the average number of times each post is commented on by the plurality of one or more other users is given a weight 4, wherein the average number of times each post is shared by the plurality of one or more other users is given a weight 5, and wherein weight 1≤weight 2≤weight 3≤weight 4≤weight 5.

21. The storage device of claim 18, wherein the events of the network-derived content comprise the product of the number of groups owned by the user multiplied by the number of people in each group, the number of pictures the user was tagged in, the number of posts the user was mentioned in and the number of posts to the user's wall.

22. The storage device of claim 21, wherein the number of groups owned by the user multiplied by the number of people in each group is given a weight 6, wherein the number of pictures the user was tagged in by the plurality of one or more other users is given a weight 7, wherein the number of posts the user was mentioned in by the plurality of one or more other users is given a weight 8, wherein the number of posts to the user's wall by the plurality of one or more other users is given a weight 9, and wherein weight 7≤weight 6=weight 9≤weight 8.

23. The storage device of claim 17, wherein the social leader is selected from the user and the plurality of other users in the top 1%-10% of users based upon the relative scores.

24. The storage device of claim 17, wherein the social leader is selected from the user and the plurality of other users of having an absolute score of 20%-50% above the average absolute score.

* * * * *